Feb. 3, 1959 G. J. MARTIN 2,872,575
ELECTRONIC SWITCH
Filed July 23, 1956
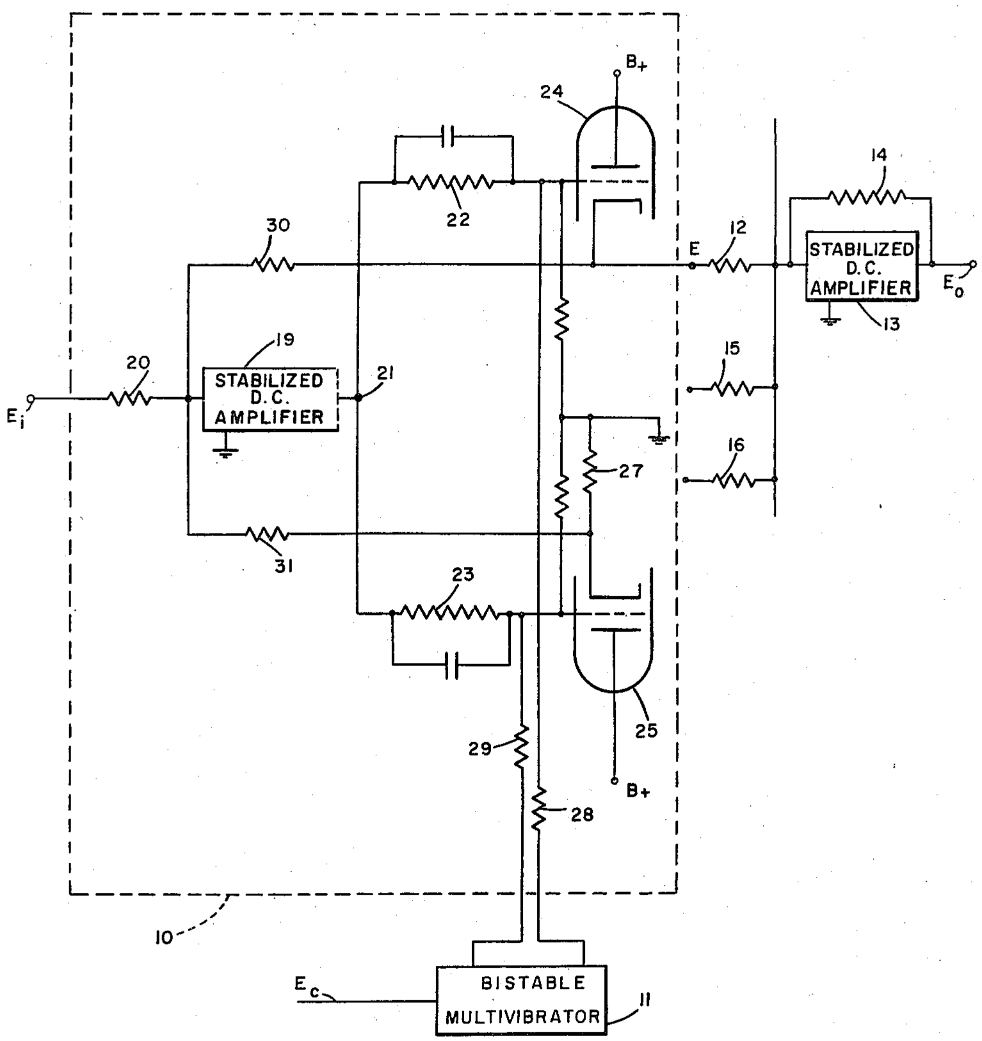
*INVENTOR.*
GUENTHER J. MARTIN
*BY* William R. Sherman
HIS ATTORNEY United States Patent Office 2,872,575

Patented Feb. 3, 1959

2,872,575

ELECTRONIC SWITCH

Gunther J. Martin, Ridgefield, Conn., assignor, by mesne assignments, to Schlumberger Well Surveying Corporation, Houston, Tex., a corporation of Texas Application July 23, 1956, Serial No. 599,533

3 Claims. (Cl. 250—27)

This invention relates to electronic switches and more particularly to switches which employ a feedback amplifier for selectively transmitting D. C. signals.

In a wide variety of electronic apparatus, such as analog-digital converters, digital-analog converters, multipliers and function generators, precision switching is desirably accomplished at high speeds to permit handling a greater amount of information. For example, in copending application Serial No. 516,868, filed June 21, 1955, by Gunther Martin for "Signal Converting Systems," high speed diode switches are disclosed for controlling the summing of weighted signals by an operational amplifier to convert the binary coded output of an analog-digital converter to a quantized analog signal for comparison with the analog signal to be coded. Because of the appreciable interelectrode capacitance of diodes, however, the rate of conversions and hence the smoothness of following the analog input with a coded output is limited. Moreover, special provisions must be taken to compensate for so-called diode drift.

In general, prior art electronic switches for D. C. signals are undesirably limited in one or more of the following respects: (1) insufficient switching speed, (2) susceptibility to drift, (3) non-linearity, and (4) incomplete attenuation of the switched off signal.

It is an object of the present invention to provide new and improved electronic switches which largely overcome the enumerated limitations of prior art devices.

It is another object of this invention to provide electronic switches which are particularly adapted for controlling the application of input signals to an operational amplifier.

These and other objects are attained, in accordance with the invention, by deriving an output signal from the first of a pair of cathode followers comprising a balanced output stage of a high gain stabilized D. C. amplifier and further providing a degenerative feedback circuit from each of the cathode followers to the input of the amplifier. By selectively driving the first cathode follower to cut-off, the output signal is fully attenuated, the second cathode follower serving to provide degenerative feedback to maintain the input substantially at zero. When the second cathode follower is cut-off, the first cathode follower develops an output signal across its cathode resistor which linearly corresponds with the input signal and at the same time provides degenerative feedback to the input of the amplifier.

The invention will be better understood from the following detailed description taken in conjunction with the drawing in which the single figure is a circuit diagram of a typical electronic switch arranged in accordance with the invention.

In the figure there is shown an electronic switch 10 for switching a unipolar or D. C. signal $E_1$ which may be either fixed or variable with time. The switch 10 is arranged to be actuated by a source of biasing potential such as a bistable multivibrator 11 of any suitable design.

Multivibrator 11 has two output terminals at which potentials are developed having a high or a low potential depending upon the state to which the multivibrator is driven by pulses of a suitable control signal $E_c$. As one output terminal is at a high potential and the other at a low potential and such potentials are reversed by the application of a pulse to the multivibrator, the bistable multivibrator is often descriptively termed a flip-flop. Where the electronic switch 10 is utilized in an analog-digital converter of the type disclosed in the above-mentioned application Serial No. 516,868, the multivibrator 11 may constitute a stage of a binary counter to control the switch in accordance with the 0 or 1 state of the stage.

Further to show electronic switch 10 in a suitable application, its output is coupled via input resistor 12 to the input of a stabilized wide band high gain D. C. amplifier 13 having a feedback resistor 14 degeneratively coupling its output to its input. Additional input resistors 15, 16 are shown as representative of an adding network which may be controlled by electronic switches similar to switch 10 and utilized, for example, in an error determining circuit of an analog-digital converter of the type shown in copending application Serial No. 516,868.

The electronic switch 10 of this invention coprises, more particularly, a stabilized D. C. amplifier 19 which preferably has a relatively high gain, wide band characteristic. Stabilization of amplifier 19 may be accomplished in any suitable manner, such as by the use of a drift stabilizing amplifier incorporating the well known chopper-stabilizing circuit, details of which are not necessary to an understanding of the present invention. A resistor 20 couples the input signal $E_1$ to the input stage of D. C. amplifier 19. The last voltage amplifying stage of D. C. amplifier 19, which may comprise, for example, a pentode amplifier, has its output coupled from junction point 21 in parallel via coupling resistors 22, 23 to the control electrodes of triode amplifying devices 24, 25. These amplifying devices 24, 25 are connected to provide a balanced cathode follower output stage for amplifier 19. Resistor 12 effectively constitutes a cathode resistor for amplifying device 24 by its connection between the cathode of device 24 and the input terminal of D. C. amplifier 13. It may thus be noted that amplifier 13 is operative degeneratively to maintain its input terminal substantially at ground potential and has an output potential $E_O$ which is a linear function of the potential E coupled via its input resistor 12. Cathode resistor 27 is connected between the cathode of amplifying device 25 and ground and, for balanced operations, is desirably equal in value to resistor 12.

Switching is accomplished by coupling one output terminal of the bistable multivibrator 11 through resistor 28 to the control electrode of amplifying device 24. In a given state of the multivibrator, such as its 0 state, the potential applied by it to the control electrode is sufficiently negative to drive the amplifying device 24 to cut-off. In the other state of the multivibrator, such as the 1 state, the bias signal applied by the multivibrator to the control electrode permits normal cathode follower operation. Resistor 29 similarly couples the other terminal of multivibrator 11 to the control electrode of amplifying device 25. When the multivibrator is in its 1 state, the potential coupled to the control electrode is sufficiently negative for cut-off of device 25, while in the 0 state, cathode follower action of device 25 is permitted. Anodes of the amplifying devices 24, 25 are directly connected to the positive terminals B+ of a suitable source of anode current.

To provide degenerative feedback from the output to the input of D. C. amplifier 19 regardless of the state of multivibrator 11, feedback resistor 30 connects the cathode of cathode follower 24 to the input terminal of the D. C. amplifier 19, and feedback resistor 31 similarly connects the cathode of cathode follower 25 to this input terminal. In an exemplary design, the input potential $E_i$ may have a fixed value of, say, a negative 100 volts and the circuit parameters may be as follows:

| | Kilohms |
|---|---|
| Input resistor 20 | 400 |
| Resistors 12, 27 | 100 |
| Feedback resistors 14, 30, 31 | 100 |
| Resistor 15 | 80 |
| Resistor 16 | 40 |
| Resistors 28, 29 | 100 |

The triodes 24, 25 may suitably be the type 12AX7 which requires a relatively low bias and can readily be driven to cut-off. For example, a swing in the potentials supplied via coupling resistors 28, 29 from multivibrator 11 between +25 volts and −60 volts has been found suitable for precise switching. Multivibrators which may provide this 85 volt swing in one microsecond are readily available.

In operation, a steady or varying input signal $E_i$ of a single polarity is applied to the input terminal of electronic switch 10 to produce a corresponding potential E at the output of the D. C. amplifier 19. The relationship between the output potential E of D. C. amplifier 19 and the input potential $E_i$ is given by the well known expression:

$$E=\frac{R_f}{R_i}E_i \quad (1)$$

where $R_f$ is the resistance of either of feedback resistors 30, 31 and $R_i$ is the resistance of input resistor 20. However, the output signal E is developed at the output terminal of the electronic switch 10 only when cathode follower 24 is conducting and not when it is driven to cut-off.

As an example, a 12AX7 triode may be cut-off to $2\times10^{-7}$ amperes with a −30 volts bias. With resistor 12 having a value of 100 kilohms, the zero error as a result of the finite conductance of the cathode follower 24 at cut-off is 0.032 volt, which is slightly more than a 0.1% error. With lower resistance values for resistor 12, the zero error is correspondingly reduced.

When the switching triode 24 is biased to conductance, a very small summing error $\epsilon$ exists which is characteristic of feedback amplifiers and is given by the expression:

$$\epsilon=\left(1+\frac{R_f}{R_i}\right)\frac{E}{G(1+A)} \quad (2)$$

where $R_f$ is the resistance of resistor 30, $R_i$ is the resistance of resistor 20, E is the output potential of the cathode follower 24, G is the gain of the D. C. amplifier 19, and A is the gain of the drift stabilizing circuit within amplifier 19. This error is readily minimized by designing amplifier 19 with a relatively high drift stabilizing gain A, such as 40 db at zero frequency, for example. A reasonable amplifier gain G, preferably extending over as wide a bandwidth as possible, may suitably be 60 db. Effectively, then, a gain of 100 db at zero frequency is available to minimize the summing error and amplifier drift, while 60 db of gain is available at the switching frequency to minimize switching transients.

As a result of the stabilization and linearization of the D. C. amplifier 19 obtained with feedback, switching of the input potential $E_i$ is virtually independent of the characteristics of the cathode followers 24, 25 and is, moreover, highly linear and drift free. The gain of the amplifier 19 at the switching frequency ensures a minimum of switching transients at the output of cathode follower 24 so that switching may be accomplished with precision.

While a single embodiment has been shown and described to exemplify the principles of the invention, various modifications may be made without departing from its spirit and scope. Accordingly, the invention is not to be limited to the illustrative embodiment but is of a scope defined in the appended claims.

I claim:

1. An electronic switch comprising: amplifier circuit means having input and output terminals for translating a signal to be switched; first and second cathode follower circuits each including an amplifying device having an anode, a control electrode, and a cathode; circuit means for coupling each of said control electrodes to the output terminal of said amplifier circuit means; first and second cathode impedances coupled between the cathodes of the respective amplifying devices and points of fixed reference potential; first and second feedback circuit means coupled between the cathodes of the respective amplifying devices and the input terminal of said amplifier circuit means; and circuit means for alternately biasing the amplifying devices to a nonconductive condition thereby to cause the signal to alternately appear at one or the other of the cathodes of the respective amplifying devices.

2. An electronic switch as specified in claim 1 wherein said circuit means for alternately biasing the amplifying devices to a nonconductive condition comprises a multivibrator circuit having its output terminals coupled to the control electrodes of the respective amplifying devices.

3. An electronic switch comprising: a stabilized direct-current amplifier having input and output terminals for translating a signal to be switched; first and second electron-discharge devices each having an anode, a control electrode, and a cathode; circuit means for supplying operating potentials to the anodes; first and second coupling resistors for coupling the control electrodes to the output terminal of said direct-current amplifiers; first and second cathode resistors coupled between the cathodes of the respective electron-discharge devices and points of fixed reference potential; first and second feedback resistors coupled between the cathodes of the respective electron-discharge devices and the input terminal of said direct-current amplifier; and a multivibrator circuit having its output terminals coupled to the control electrodes of the respective electron-discharge devices for alternately biasing the electron-discharge devices to a nonconductive condition thereby to cause the signal to alternately appear at one or the other of the cathodes of the respective electron-discharge devices.

References Cited in the file of this patent

UNITED STATES PATENTS 2,710,348 Baum et al. ............ June 7, 1955

UNITED STATES PATENT OFFICE

Certificate of Correction

Patent No. 2,872,575 February 3, 1959

Gunther J. Martin

It is hereby certified that error appears in the printed specification of the above numbered patent requiring correction and that the said Letters Patent should read as corrected below.

Column 2, line 8, after "flip-flop" strike out the comma and insert instead a period; line 26, for "coprises," read —comprises,—; column 3, line 42, for "100 kilohms," read —160 kilohms,—; line 51 to line 53, for $$\epsilon=\left(1+\frac{R_f}{R_1}\right) \quad \text{read} \quad \epsilon=\left(1+\frac{R_f}{R_i}\right)$$

Signed and sealed this 2nd day of June 1959.

[SEAL]

Attest:
KARL H. AXLINE,
*Attesting Officer.*

ROBERT C. WATSON,
*Commissioner of Patents.*